United States Patent [19]

Joy et al.

[11] 4,414,293

[45] Nov. 8, 1983

[54] PARASITIC CORROSION RESISTANT ANODE FOR USE IN METAL/AIR OR METAL/O₂ CELLS

[76] Inventors: Richard W. Joy, Santa Clara; David F. Smith, Boulder Creek, both of Calif.

[73] Assignee: The United States of America as represented by the U.S. Department of Energy, Washington, D.C.

[21] Appl. No.: 420,052

[22] Filed: Sep. 20, 1982

[51] Int. Cl.³ .............................................. H01M 4/12
[52] U.S. Cl. ..................................... 429/27; 429/218; 429/233
[58] Field of Search ............... 429/27, 229, 233, 28, 429/119, 30, 152, 153, 218

[56] References Cited

U.S. PATENT DOCUMENTS

| | | | |
|---|---|---|---|
| 2,144,574 | 1/1939 | MacCallum | 429/229 |
| 3,479,225 | 11/1969 | Chodosh et al. | 429/28 |
| 3,876,470 | 4/1975 | McBreen | 429/229 |
| 4,115,626 | 9/1978 | Sauer et al. | 429/27 |

*Primary Examiner*—Donald L. Walton
*Attorney, Agent, or Firm*—Roger S. Gaither; L. E. Carnahan; Richard G. Besha

[57] ABSTRACT

A consumable metal anode which is used in refuelable electrochemical cells and wherein at least a peripheral edge portion of the anode is protected against a corrosive alkaline environment of the cell by the application of a thin metal coating, the coating being formed of metals such as nickel, silver, and gold.

7 Claims, 3 Drawing Figures

PARASITIC CORROSION RESISTANT ANODE FOR USE IN METAL/AIR OR METAL/O₂ CELLS

BACKGROUND OF THE INVENTION

The U.S. Government has rights in this invention pursuant to Purchase Order No. 5513309 with The Continental Group, Inc., under Prime Contract No. W-7405-ENG-48 between the University of California and the U.S. Department of Energy.

This invention relates in general to new and useful improvements in electrochemical cells, and more particularly to a consumable anode for use in such cells.

This invention particularly relates to a consumable electrode which is formed of a metal of the type including aluminum and lithium, and more particularly to providing such anode on the non-electrochemically active face thereof with a corrosion inhibiting coating.

Metals, such as aluminum and lithium, which are used in electrochemical cells as anodes, are highly corrosive, particularly when placed in an alkaline environment, such as the electrolyte used in electrochemical cells. As the result of this corrosive action, the edges of the anodes tend to be depleted first, thus changing the active surface area of the anode. In the past, edges of such anodes have been protected by the use of paints, plating masks, etc. However, the prior known methods of providing protection to such anodes have not been effective in eliminating corrosion due to poor adhesion and/or tunneling effects. In addition, such prior coated anodes may not be used for refuelable systems due to the non-soluble deposit left by the coating material as the anodes are consumed.

SUMMARY OF THE INVENTION

Therefore, it is an object of this invention to provide an improved consumable anode for electochemical cells.

A further object of the invention is to provide a coating about the non-electrochemically active surfaces of the anode for preventing adverse effects about the edges thereof.

Another object of the invention is to provide a protective metal coating about at least the edges of a consumable anode.

In accordance with this invention, metal anodes used for refuelable electrochemical cells are coated on the non-electrochemically active faces with a thin film of a metal which is chemically inert in alkali type electrolyte and which eliminates the tunneling effect. Nickel is preferred as the primary film in view of the availability and cost thereof. However, other metals including silver and gold may be utilized for such coating material.

It is also preferable to permit the protective coating or film to not only extend over the edges of the anode but also to overlap the active face of the anode to provide a border of the protective metal. This eliminates tunneling effects which are found with straight edge coatings.

In one embodiment of the invention the coating is placed only about the periphery of the anode with overlapped edges to provide for two active face surfaces of the anode.

With above and other objects in view that will hereinafter become apparent to those skilled in the art, the nature of the invention will be more clearly understood by reference to the following detailed description, the appended claims, and the several views illustrated in the accompanying drawings.

DETAILED DESCRIPTION OF THE INVENTION

The present invention is directed to a means of preventing undesirable corrosion of a consumable anode utilized in electrochemical cells, particularly of the refuelable or replaceable anode type.

Figure 1:
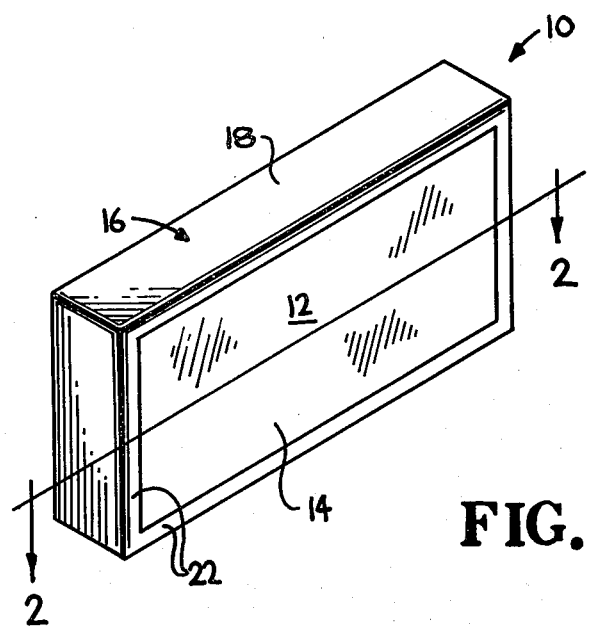
FIG. 1 is a perspective view of a metal anode having a coating film in accordance with this invention.

Referring now to the drawings, it will be seen that there is illustrated in FIG. 1 a corrosion inhibiting metal anode of the invention for use in an electrochemical cell. The anode is generally identified by the numeral 10. The anode 10 includes a consumable metal member 12 which is a plate-like member rectangular in outline and of a substantially uniform thickness. The member 12 which for example may be constructed of aluminum, lithium metal, or other reactive metal, has an active face 14 which is intended to be associated with a cathode of the metal/air or metal/O₂ type, of an electrochemical cell, the face 14 being enagaged directly with an intermediate current collector as known in the art. The necessary electrolyte will flow across the face 14 to provide the necessary chemical reaction which results in the member 12 being gradually consumed across the entire face 14.

Figure 2:
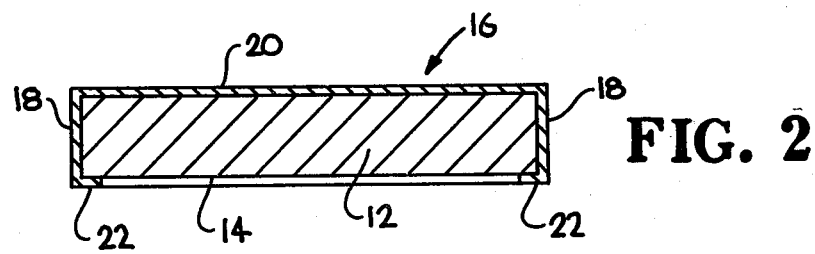
FIG. 2 is a horizontal sectional view taken generally along the line 2—2 of FIG. 1 of the coated anode, and shows specifically the details of the applied coating.

In accordance with this invention, the plate-like member 12 of anode 10 is substantially encased in a protective housing or coating 16 which is in the form of a very thin film of metal. The housing or coating 16 includes a peripheral portion 18 which extends entirely about the edge of the member 12, as shown in FIGS. 1 and 2. A rear protective coating or film portion 20 extends across the rear face of the member 12 and is integral with the peripheral portion 18. Further, the protective coating or film 16 has a very narrow portion 22 which extends about the periphery of the face 14 of member 12 and which is integral with the peripheral portion 18.

By way of example, the member 12 of anode 10 has a width of 2.0", height of 2.0" and thickness of 0.250", with the protective coating 16 having a thickness of 0.005", and with the portion 22 extending about 0.125" over the periphery of the face 14.

As stated above, the member 12 may be formed of aluminum or lithium and the protective film or coating 16 is formed of a metal which is corrosion inhibiting or chemically inert in alkali. While the preferred metal is nickel, silver, gold and the like may also be utilized.

The coating or film 16 is preferably applied to member 12 by electrolysis methods well known to those skilled in the art.

Figure 3:
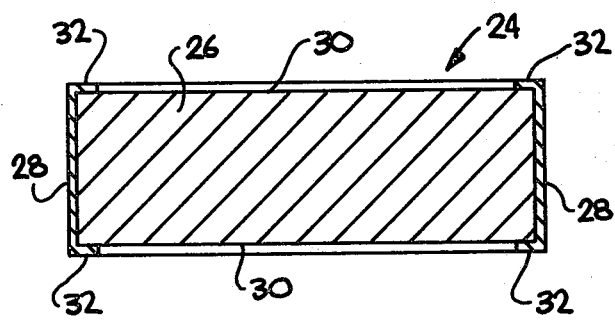
FIG. 3 is a horizontal sectional view taken through a similar anode, but wherein the anode is usable in conjunction with two cathodes in a dual cell construction.

The anode of FIGS. 1 and 2 is an anode which is intended to replace another anode in a refuelable cell construction and is associated with a single cathode. Copending U.S. patent application, Ser. No. 270,113, filed June 3, 1981, now U.S. Pat. No. 4,389,466 issued June 21, 1983, illustrates such a refuelable cell construction. However, there are anodes which are replaceable in refuelable cells of the twin cell type wherein there is a single anode disposed between two cathodes. Such an anode, generally identified by the numeral 24 is shown in FIG. 3. The anode 24 includes a consumable plate-like member 26 which is formed of aluminum or lithium and is of a generally rectangular outline as shown in FIG. 1 with respect to the member 12. However, because the consumption rate of the anode 24 is twice that of the anode 10, it has a thickness approaching twice the thickness of the member 12.

In accordance with this invention, the anode 24 is provided with a peripheral metal film or coating 28 which extends about the periphery of the member 26. Since opposite faces 30 of the member 26 are electrochemically active, the coating or film 28 cannot be applied to the faces 30. However, like the protective film 16 with respect to the face 12, the protective film 28, in addition to extending about the periphery of the member 26, has a border portion 32 which extends about the periphery of each of the faces 30. In this manner the aforementioned undesirable tunneling effect is eliminated.

The member 26 of anode 24 is formed of the same metals as the member 12 and the protective film or coating 28 is also formed of the same metals as the protective film 16, with nickel being the preferred coating metal.

It is to be understood that the metals which are feasible for use in forming the protective film, when applied as thin films, eliminate the problem of residue in the cell proper in that the film material will break into very fine particulates which cause no difficulties.

Although only preferred embodiments of the coated anode have been specifically illustrated and described herein, it is to be understood that variations may be made in the anode coating without departing from the scope of the invention as defined by the appended claims.

What is claimed is:

1. A consumable anode for use in a corrosive environment of an electrochemical cell, said anode being in the form of a plate-like member having remote faces and a peripheral edge and being formed of a reactive metal, said anode being improved by a protective film of a corrosion inhibiting metal extending entirely over said peripheral edge and at least peripheral portions of said faces to prevent the peripheral edge from being adversely affected by the environment.

2. An anode according to claim 1 wherein said corrosion inhibiting metal is selected from a group including gold, nickel and silver.

3. An anode according to claim 2 wherein said metal is nickel.

4. An anode according to claim 1 werein said anode is of a single cell type and one of said faces is inactive, and wherein said film completely covers said inactive face.

5. An anode according to claim 1 wherein said anode is of a dual cell type, and said corrosion inhibiting metal extends over peripheral portions of each of said faces.

6. An anode according to claim 1 wherein said anode is formed of material selected from the group of aluminum and lithium.

7. An anode according to claim 6 wherein said anode is formed of aluminum.

* * * * *